Figure 1:
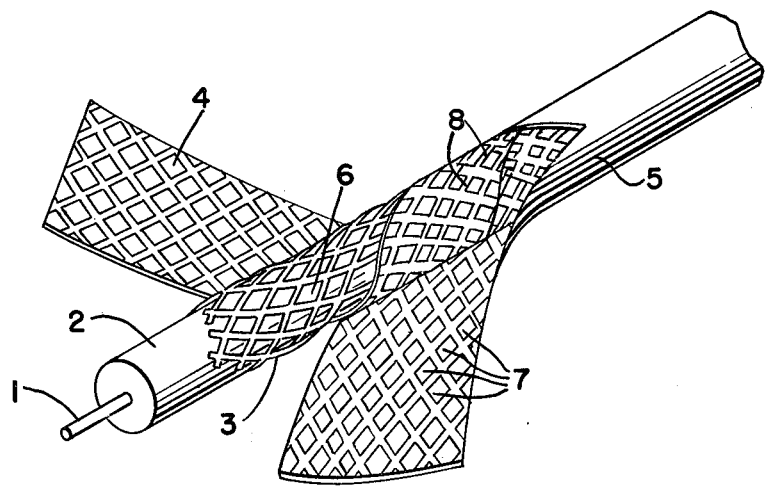

United States Patent [19]

Voser

[11] 4,187,391

[45] Feb. 5, 1980

[54] HIGH FREQUENCY COAXIAL CABLE AND METHOD OF PRODUCING SAME

[75] Inventor: Othmar Voser, Möriken, Switzerland

[73] Assignee: Kupferdraht-Isolierwerk Ag Wildegg, Wildegg, Switzerland

[21] Appl. No.: 868,418

[22] Filed: Jan. 10, 1978

[30] Foreign Application Priority Data

Jan. 12, 1977 [CH] Switzerland .................. 372/77

[51] Int. Cl.² .......................................... H01B 11/06
[52] U.S. Cl. .................................. 174/106 R; 156/56; 174/107; 174/109
[58] Field of Search ............... 174/107, 36, 106 R, 174/105 R, 102 R, 108, 109; 156/50, 53, 56; 333/96

[56] References Cited

U.S. PATENT DOCUMENTS

| 3,051,771 | 8/1962 | Lee | 174/109 |
| 3,240,867 | 3/1966 | Maddox | 174/109 |
| 3,474,186 | 10/1969 | Hale | 174/109 |
| 3,484,532 | 12/1969 | Anderson | 174/36 |
| 3,594,491 | 7/1971 | Zeidlhack | 174/107 |
| 3,643,007 | 2/1972 | Roberts et al. | 174/106 R |
| 3,927,247 | 12/1975 | Timmons | 174/107 |

FOREIGN PATENT DOCUMENTS

| 2522000 | 10/1976 | Fed. Rep. of Germany | 174/107 |
| 2525149 | 12/1976 | Fed. Rep. of Germany | 174/107 |

OTHER PUBLICATIONS

A. D. Bunch, et al., IBM Technical Disclosure Bulletin, vol. 15, No. 1, Jun. 1972, p. 36.
German Utility Model (Gebrauchsmuster), No. 1,951,548, Felten & Guilleaume Carlswerk, Dec. 15, 1966.

*Primary Examiner*—Bruce A. Reynolds
*Assistant Examiner*—E. F. Borchelt
*Attorney, Agent, or Firm*—William J. Daniel

[57] ABSTRACT

A high frequency coaxial cable suitable for aerial and ultra-high-frequency lines of the type having a metal internal conductor, a plastic dielectric concentrically surrounding the internal conductor, an external conductor surrounding the dielectric and comprising a metal wire mesh and a plastic foil strip metallized on at least one side, and a plastic sheath enveloping the external conductor as an external protective cover, wherein the wires of the wire mesh are arranged in net-like configuration to define an open wire mesh enclosing the dielectric and the plastic foil strip is applied on the wire mesh in helical edgewise overlapping windings with its metallized side facing the wire mesh and is pressed into each single mesh opening of the wire mesh in form of a generally trough-like dent or dimple thereby short-circuiting each single mesh opening of the wire mesh. The plastic foil strip is preferably pressed into the wire mesh opening during the application of the plastic sheath by extruding the latter under high pressure.

13 Claims, 2 Drawing Figures

HIGH FREQUENCY COAXIAL CABLE AND METHOD OF PRODUCING SAME

The invention relates to a coaxial cable, particularly for aerial lines, having a metal internal conductor of a specific electric conductance in excess of $10^5$/ohm.cm, a plastic dielectric concentrically surrounding the internal conductor in a plastic with a specific electric conductance in excess of $10^{-10}$/ohm.cm and a dielectric constant below $10^{-12}$sec/ohmcm, an external metal conductor surrounding the dielectric, and a plastic sheath surrounding the external conductor as an external protective cover.

Coaxial cables of this type are generally known and are used chiefly as aerial lines for the connection of television and ultra-short-wave aerials with the corresponding receiving sets. In the coaxial cables of this type used hitherto the external conductor is usually a wire mesh made of two groups approximately equal in number of thin copper wires running in an opposite sense of rotation helically around the dielectric and braided together at their points of intersection, which are mostly blank or galvanised, and may also be silvered in many cases. These coaxial cables provided with a wire mesh as an external conductor have the advantage that, when the cable is bent to a considerable extent, as may be the case for example when the cable is laid around a corner, no reflection areas are to be feared at the places of bending, as the wire mesh is extraordinarily flexible and can therefore adapt itself in the curvature area of the cable to the curved dielectric in such a manner that no substantial alteration of the surge impedance of the cable in the curvature area develops. This advantage is of great importance in connection with the chief use of these cables as aerial lines since the aerial leads particularly in dwelling houses, where indeed the greater part of television and ultra-short-wave receivers are installed, have to be led around a multiplicity of corners along the path extending from the antenna to the TV/USW socket in the living-room in most cases, and therefore considerable losses would arise along the aerial line if at each of these corners there were to develop a reflection area in the cable (e.g. a damping of power along the aerial line by more than a factor of 100, when the aerial line is passed around 7 corners and at each corner half the arriving power is reflected).

However with these known coaxial cables provided with a wire mesh as external conductor it is a drawback that the energy penetration through the wire mesh is not nil and in particular becomes greater as the frequency increases. Then, as a result there arise, on the one hand, increasing radiation losses as the frequency increases and, on the other hand, as the frequency increases, an increasing irradiation from outside into the cable and a correspondingly increasing noise level, so that the transmission properties of the cable rapidly worsen as the frequency increases. The known coaxial cables provided with a wiremesh as external conductor are therefore usable only up to the VHF range, that is to say up to frequencies of a maximum of 300 MHz, in connection with which the transmission properties already worsen noticeably in the upper portion of the VHF range, i.e. from about 100 MHz.

Among other things, this disadvantage has led to the fact that joint aerial installations provided in many dwellings and intended for the reception of television transmitters operating in the VHF range have not been suitable for the reception of television transmitters operating in the UHF range or for the transmission from an UHF aerial installed subsequently in the individual dwellings and therefore, to prevent the need to replace the entire cable system for the joint aerial installation, it has been necessary to provide frequency converters for the conversion of the UHF bands to be received into the VHF range in the aerial amplifier and decouplers of the installation.

Therefore, attempts have now being made for 10 years to develop coaxial cables of the type in question which possess the same, or similarly advantageous, qualities as regards their possibilities of installation as the above-described lines, with a wire mesh as external conductor, but not only in the VHF range but also in the UHF range, i.e. which are usable up to about 3 GHz. The attempts made to this end hitherto, however, have not led yet to a satisfactory outcome.

Indeed, it becomes possible, without too great difficulties, to produce coaxial cables whose transmission range exceeds even 3 GHz, if use is made as external conductor of a cylindrical copper tube or a tubular bent, sheet of copper joined without a seam along its edges, but coaxial cables with such an external conductor are absolutely not flexible and only tolerate, without injury to their transmission properties, bends with a radius of curvature of the order of meters in length; therefore they are not suitable for installation in dwelling houses even when already prepared cable channels are available. In the first place, the cable channels which are made today from relatively flexible plastic tubes are in most cases not led in a straight line along their entire length, but are bent at specific places at radii of curvature which lie partly well below one meter, and secondly, on pulling the coaxial cables through the cable channels at the junction and end boxes provided for the purpose at the open ends of the cable channels, there develop bends in the coaxial cable to be pulled through having radii of curvature considerably under one meter. Coaxial cables with a copper tube or a tubularly bent copper sheet as external conductor are therefore used in aerial installations only for connection of the aerial with the aerial amplifier or the frequency converter, a rectilinear path for the cable and thereby a vertical arrangement of the amplifying and converting apparatus under the aerial being a necessary requirement.

Building up upon the experience that with a copper tube or a tubularly bent copper sheet as external conductor transmission ranges of even more than 3 GHz can be achieved with coaxial cables of the type in question without considerable difficulties, a first attempt that has been made to improve the flexibility of such cables involved the use, instead of a copper sheet bent together and joined without a seam at its edges, of an external conductor of a copper foil strip extending along the longitudinal direction of the cable and wrapped around the dielectric with overlapping of the strip edges. In fact, with such coaxial cables provided with a copper foil strip as external conductor it has been possible to achieve, with considerably better flexibility, transmission ranges of almost up to 3 GHz, as long as the cable was not installed. After installation, however, the transmission range at the upper end still reached only about 300 to 500 MHz, and in many cases even only up to 100 MHz, even though the cables had been laid in cable channels and therefore too pronounced bends of the cables along the path of laying had been ruled out. An investigation then revealed that the cables had become considerably bent on being pulled into the cable channels, and as a result transverse tears had developed in the copper foil along the entire length of the cable pulled in, and each of these transverse cross-tears formed a place of reflection and additionally a radiation area. Consequently, the utilisation of such coaxial cables provided with a copper foil strip as an external conductor was ruled out in practice, as the requirement that the cables during installation, may not be bent below a specific radius of curvature, cannot in practice be realistically imposed upon the installation personnel, quite independently of the fact that these cables are not suitable outright for free laying and passing round corners.

In order to eliminate at least partly the negative effects of the thus practically unavoidable cross-tears in the copper foil strip, an attempt was then made to prevent as much as possible reflections at those cross-tears by means of a wire mesh surrounding the copper foil strip and forming together with the latter the external conductor of the coaxial cable. The basic rationale of this idea was that the wire mesh bridges over the cross-tears and would thus exclude any extensive reflection at the cross-tears. As, however, the depth of penetration extremely shallow e.g. at 1 GHz only about 10µ, and is therefore substantially smaller than the thickness of the copper foil, the travelling wave runs first along the internal wall of the dielectric facing the dielectric, along the longitudinal direction of the cable, until it comes to the cross-tear, and there the travelling wave, in order to be able to make use of the bridging-over of the cross-tear through the wire mesh lying on the outside, must penetrate through the cross-tear out of the internal space surrounded by the copper foil, and it is only then that it can pass the cross-tear via the wires of the wire mesh. This penetration of the travelling wave out of the inner space surrounded by the copper foil has the consequence that the radiation losses at the cross-tear increase considerably and the reduction of reflection effected by the bridging-over is as a consequence of the apparent load resistance with which the line is additionally loaded by the increased radiation at the cross-tear area, partly cancelled. The wire mesh applied on the copper foil does in fact bring about again a certain improvement in the upper limit of the transmission range of the cable but, on account of the increase of the radiation losses at the cross-tears and of the only incomplete reduction of reflection there, is far below expectations. For these reasons, coaxial cables with an external conductor consisting of a copper foil strip and a wire mesh laid thereon could not establish themselves on the market. A further attempt at developing coaxial cables of the type in question combining flexibility and broad transmission range was along the lines of an improvement of the transmission properties in the UHF range of the co-axial cables provided with a wire mesh as external conductor. Certain improvements were in fact achieved by reducing the mesh width of the wire meshes in that, on the one hand the radiation losses of the cable outwards, and on the other hand the irradiation into the cable from outside, and thereby the noise level, could be decreased. However, the reduction of the mesh width of the wire mesh led also at the same time to a worsening of the flexibility of the cable, as naturally the yielding possibilities of the individual wires of the wire mesh or the relative displaceability of the wires one to the other, determining flexibility, became all the smaller as the meshes of the wire were narrower. This impairment of the flexibility of the cable had the effect that the reflections at the places where the cable had to be passed around a corner when being laid increased considerably from the point where the mesh width of the wire mesh fell short of a specific value, and therefore when such mesh width was not reached the upper limit of the transmission range of the cable which increased at first when the mesh width of the wire mesh decreased again fell. For these reasons the increase of the upper limit of the transmission range of the cable through the reduction of the mesh width of the wire mesh turned out to be considerably less than expected.

Therefore, it was the object of the invention to produce a coaxial cable of the kind defined above that is as acceptable in terms of flexibility and ease of installation as the said known coaxial cable provided with a wire mesh as external conductor, but can transmit in the UHF range.

According to the invention this is achieved in a coaxial cable of the kind defined above wherein, between the dielectric and the plastic sheath, a plastic foil which is metallised on at least one side is applied helically or in crêped form along the longitudinal direction of the cable on the cable and covers it completely.

The advantage of this metallised plastic foil is that when the thickness of the metal coating is sufficient, there is achieved a practically complete screening of the internal space of the cable against the effect of external interference fields and therefore a very low noise level and at the same time an almost complete suppression of the outward radiation of the cable and of the radiation losses associated with it, and nevertheless the flexibility of the cable is not lost—as would be the case with a metal foil applied on the wire mesh—so that the present coaxial cable can be laid just as well as the conventional coaxial cable, and yet makes possible a considerable raising of the upper limit of the transmission range.

The plastic foil may appropriately be applied on the cable in the form of one or more metallised foil strips. In this arrangement it is possible for the foil strip either to be applied helically around the cable, with overlapping of its strip edges, or, assuming that it has been crêped, it may extend along the longitudinal direction of the cable and, along its transverse direction, it may be wrapped around the cable with overlapping of its edges.

Advantageously, the external conductor of the present coaxial cable may be formed of flexible wire netting applied on the dielectric, and the metal coating of the metallised plastic foil may form an external screening of the cable insulated from the external conductor; for this embodiment use is made of a plastic foil metallised only on one side and applied with the metallised side outwards into the wire netting.

In the preferred method of embodiment of the present coaxial cable, however, the external conductor is formed jointly from a flexible wire mesh applied on the dielectric and the metal coating of the metallised plastic foil, the metal coating of the plastic foil giving external protection for the cable at the same time; in this arrangement, the plastic foil is applied on the wire netting and its metal coating is in direct electric contact with the wire mesh. For this preferred method of embodiment it is possible to use plastic foils which are metallised either on one side or on both sides, the plastic foil, when metallised on one side only, being applied with the metallised side inwards on the wire mesh. However, it is recommended to use a metallised plastic foil metallised on both sides, as the expansion and tear resistance properties, for the same aggregate thickness of the metal coating, are better in the case of a plastic foil metallised on both sides the in the case of a plastic foil metallised on one side only.

The flexible wire mesh in the two above-mentioned embodiments can be constructed advantageously either, as with the known coaxial cables of the kind defined above, from a wire mesh of two groups, substantially equal in number, of wires, uncovered or provided with a metallic coating, laid in opposite senses of rotation helically around the dielectric and braided together at their points of intersection, or also of two substantially equal groups of wires, each group being formed into two layers lying one on the other, the wires being uncovered or provided with a metallic coating as before, evenly distributed over the periphery of the dielectric and running in opposite senses of rotation helically around the dielectric. In the last instance the wires of the two groups which are in electric contact on the sides facing each other at their points of intersection form a wire netting which surrounds the dielectric indeed only from an electric angle, but this mode of the application of the wire netting requires, from the production point of view, a substantially smaller production expenditure than the application of a wire mesh, and does not bring about either any impairment of the transmission properties, but probably a slight improvement of the flexibility of the cable and is therefore to be preferred overall to a wire mesh. The wires of the group arranged in external position are, in the above-mentioned preferred method of embodiment of the present coaxial cable, on the external side of the layer in direct electric contact with the metal coating of the plastic foil.

If, moreover, with the above-mentioned preferred embodiment of the coaxial cable under consideration use is made of a foil strip metallised on both sides, then it is advantageous for the metal coatings on the two sides of this foil strip to be in electric contact together at the strip edges and/or points distributed over the surface of the strip. Electric contact is more advantageous in principle at the strip edges and may be achieved in that the foils are cut already before metallisation and then are passed through the metallisation apparatus at a short distance one from the other and in parallel, so that the strip edges also are metallised substantially without gaps in contrast with the now usual cutting of the foil strips from an already metallised foil web, where when the cutter blades work well there cannot arise any contact between the metal coatings on both sides of the foil strip, and when the cutters are already worn such a contact can arise only at accidental areas of crushing. However, even when the present-day usual cutting process is retained, contact between the metal coatings on the two sides of the foil strip at points distributed over the area of the strip can be achieved in that the metallisation is applied on a plastic foil perforated with small holes, because the holes, when the diameter is small enough, fill up with metal during the metallisation of the plastic foil; this metal is held firm in the hole by surface tension and after metallisation has been performed on both sides it effects the contact between the metal coatings on the two sides of the plastic foil.

The electric contact between the metal coatings on the two sides of the foil strip is of importance because by means of it, in particular with thorough contact at the strip edges, there is produced a fully closed coating of the cable with an electric conductor in a manner equivalent to that supplied in a copper tube as external conductor, and thereby the screening of the cable is not insignificantly improved, whereas, if there is no contact between the metal coatings on the two sides of the foil strip, from the inner space of the cable to the external space there arise splits covering this distance (filled with the plastic foil), over which, a radiation from the internal area of the cable may take place, though this radiation may not be very considerable. Furthermore, when there is an electric contact between the metal coatings on both sides of the foil strip, in particular with a direct electrical connection at the strip edges, the inductive resistance component of the external conductor which arises in the case of a helically applied foil strip in the absence of contact between the metal coatings on both sides of the foil strip, is not present because in that event the current flowing through the foil strip no longer mainly follows the helical path of the foil strip, but runs practically entirely along the metal coating in a direction parallel with the metal coating.

In a further very advantageous method of construction of the coaxial cable under consideration the wire-netting or wire mesh still present in the above-mentioned methods of construction are left out completely, and the external conductor of the cable is formed exclusively from the metal coating of the metallised plastic foil so that the metal coating of the plastic foil screens the cable externally at the same time. If with this method of construction a foil strip metallised on both sides and applied helically is provided, then it is absolutely necessary for the metal coatings on both sides of the foil strip to be in electric contact preferably at the strip edges or also at points distributed over the surface of the strip, as otherwise the whole current flowing through the external conductor would have to follow the helical path of the foil strip and therefore, as a consequence of the relatively great inductance arising from the helical path of the external conductor, such a great damping would arise over the cable that the cable would no longer be usable even for the VHF range. To achieve as good as possible a contact in the overlapping areas of the helically applied foil strip it is advantageous for the width of the overlapping area of the strip edges of the foil strip to be between 20% and 40% of the width of the foil strip.

Alongside the helical application of a foil strip metallised on both sides with metal coatings in electric contact preferably along the strip edges, the possibility also exists, within the framework of this method of construction, of using a crêped foil strip and applying the foil strip in such a manner that it extends along the longitudinal direction of the cable and is wrapped around the dielectric with its strip edges overlapping. In such an application of the foil strip no inductance problems arise as with a foil strip helically applied, as in this form of application the external conductor of the cable formed by the metal coating of the foil strip runs parallel with the internal conductor (if the crêping of the foil strip is disregarded). However in the overlapping area there is, particularly when using a foil strip metallised one side only, the danger of an increased radiation through the split between the overlapping layers and leading from the internal space of the cable (filled with the plastic foil). Therefore, in this case, when using a foil strip metallised on one side only, the width of the overlapping area of the strip edges of the foil strip is appropriately greater than one fifth of the width of the foil strip. The foil strip metallised on one side can in this arrangement be advantageously applied with the metallised side inwardly on the dielectric. More advantageous than a foil strip metallised on one side only is also, for this form of application with the foil strip extending along the longitudinal direction of the cable, a foil strip metallised on both sides as thereby the slit which leads from the internal space of the cable towards the outside extends along the entire width of the foil strip, and the danger of a radiation through this slit is thereby naturally considerably lessened. When using a foil strip metallised on both sides with the metal coatings on both sides of the strip in electric contact through the strip edges, the inner space of the cable is fully closed off from the outside and therefore the danger of radiation from the inner space to the outside is completely eliminated. With the last-mentioned very advantageous method of construction of the present coaxial cable it is recommended therefore, not only with a helical application of the foil strip but also with the foil strip extending in the longitudinal direction of the cable to use a foil strip metallised on both sides with direct electric connection at the strip edges between the metal coatings on both sides of the foil strip.

As material for the plastic foil use may be made advantageously with all methods of construction of the present coaxial cable of polypropylene which has, for the present purpose, outstandingly favourable properties both as regards extensibility and tear resistance and as regards adherence of the metal coating applied thereto, which persist even when the foil is stretched. The pure foil thickness (without metal coatings) may appropriately lie within the range from 10 to 100$\mu$, while foil thicknesses of 20 to 30$\mu$ are adequate in the majority of cases.

As material for the metal coating of the plastic foil aluminium has proved so far to be the most advantageous, as the adhesion of aluminium, probably on account of the surface oxide layer thereof, was the best and also exhibited the greatest resistance on the stretching of the foil. If copper is used as the metal coating for the plastic foil, on the other hand, it is necessary to keep the thickness of the copper coating as small as possible if it is desired to achieve a still stable adhesion of the copper coating. Generally speaking, in the case of aluminium coatings it is possible to have without difficulty a thickness of up to about 25$\mu$ on each of the two sides of the plastic foil, while in the case of copper coatings a thickness of 25$\mu$ is already critical. With copper coatings the foil should in any event be metallised on both sides, and the thickness on each of the two sides should, insofar as the electrical requirements imposed upon the cable permit this, lie as far as possible under 20$\mu$, preferably under 10$\mu$. As the depth of penetration with copper at the lower limit of the VHF range, i.e. at 30 MHz is indeed still about 56$\mu$, good screening is not yet obtained with 10$\mu$ thick copper coatings on both sides of the plastic foil in the bottom section of the VHF range, and therefore, when copper is used as the material for the metal coatings of the plastic foil, it is necessary either to select a thickness of copper coating at the upper limit value of 20$\mu$ (on both sides therefore a total of 40$\mu$), if it is desired also to achieve a satisfactory screening in the lower section of the VHF range, or, with a view to having a greater extensibility of the plastic foil provided with copper coatings, and thereby a greater flexibility of the cable, sacrifice a good screening effect of the metallised plastic foil in the bottom range of the VHF range. This sacrifice is not too hard when—as with the two forms of construction of the present coaxial cable first mentioned above—a wire-netting or wire mesh surrounding the dielectric is available, as the screening effect of such a wire-netting or wire mesh in the bottom section of the VHF range is still relatively good, and the metallised plastic foil applied on the wire-netting will therefore not take over the screening of the cable till the higher frequencies are reached. But if—as with the method of construction of the present coaxial cable last mentioned above—the external conductor of the coaxial cable is formed exclusively from the metal coating of the plastic foil, it is then recommended, when using copper as material for the metal coatings of the plastic foil, for achieving a satisfactory screening of the cable in the bottom section of the VHF range, to adopt as the thickness of the copper coatings on both sides of the plastic foil 15 to 20$\mu$ on each side.

Generally speaking, therefore, it is recommended to use aluminium whenever possible for the metal coatings of the plastic foil and, with a view to the screening effect in the bottom portion of the VHF range, to make the total thickness of the aluminium coating on one or both sides of the plastic foil together, in the case of a cable provided with a wire-netting or wire mesh surrounding the dielectric at least 20$\mu$, preferably more than 50$\mu$, and in the case of cables in which the external conductor is formed by the metal covering of the plastic foil, possibly more than 50$\mu$. The use of copper as material for the metal coatings of the plastic foil is recommended actually only when it is desired to have a complete encasing of the internal space of the cable in a manner equivalent to that of a copper tube as external conductor, as in this case a very good contact in the overlapping areas of the foil strips must be ensured and this is not achieved with aluminium coatings because of the surface oxidation of aluminium. A complete encasing of the inner space of the cable, however, presupposes in addition foil strips metallised on both sides with direct electric connection at the strip edges between the metal coatings on both sides of the strip, so that therefore the use of copper for the metal coatings comes under consideration practically only in connection with foil strips metallised on both sides over the strip edges. An instance where the use of copper for the metal coatings becomes necessary for the above-mentioned reasons is the above-mentioned cable with a foil strip helically applied, forming with its metal coatings the external conductor of the cable. In this and also in the majority of other cases, where the use of copper for the metal coatings is necessary, it is recommended, to obtain an optimum contact in the overlapping areas of the foil strips, to silver the copper coatings, the thickness of the silver coating, however, for economic reasons, having to lie below 0.5$\mu$, which is also completely adequate for the purposes of an optimum contact. The thickness of the copper coatings themselves should be, for the above-mentioned cable with a helically applied foil strip, forming with its metal coatings the external conductor of the cable, at least 8$\mu$ on each side, and preferably more than 20$\mu$ on both sides of the foil strip.

The invention relates furthermore to a method for the production of the coaxial cable under consideration, which is characterised in that when the plastic coating is applied by extrusion onto the metal plastic foil as the final step in production of the overall cable, the extrusion pressure is sufficiently high that the plastic foil conforms to the shape of the mesh layer, deforming into the intersticies of the meshes, and the inner wall of the plastic coating adapts itself to this deformed condition of the plastic foil.

Preferably, in this operation, the plastic coating is pressed on at a temperature within the range of from 50° C. to 200° C. and a pressure of more than 5 atmospheres, preferably 10 to 50 atmospheres, onto the plastic foil.

In the above-mentioned preferred embodiment of the coaxial cable under consideration, in which the bottom layer of the plastic foil is a wire mesh covering the dielectric only partly, in the practice of the present method the plastic foil layer is pressed inwardly into the intermediate spaces between the wires of the wire mesh, while the internal wall of the plastic coating adapts itself with knob-shaped projections to these trough-shaped recesses formed in the plastic foil layer.

Figure 2:
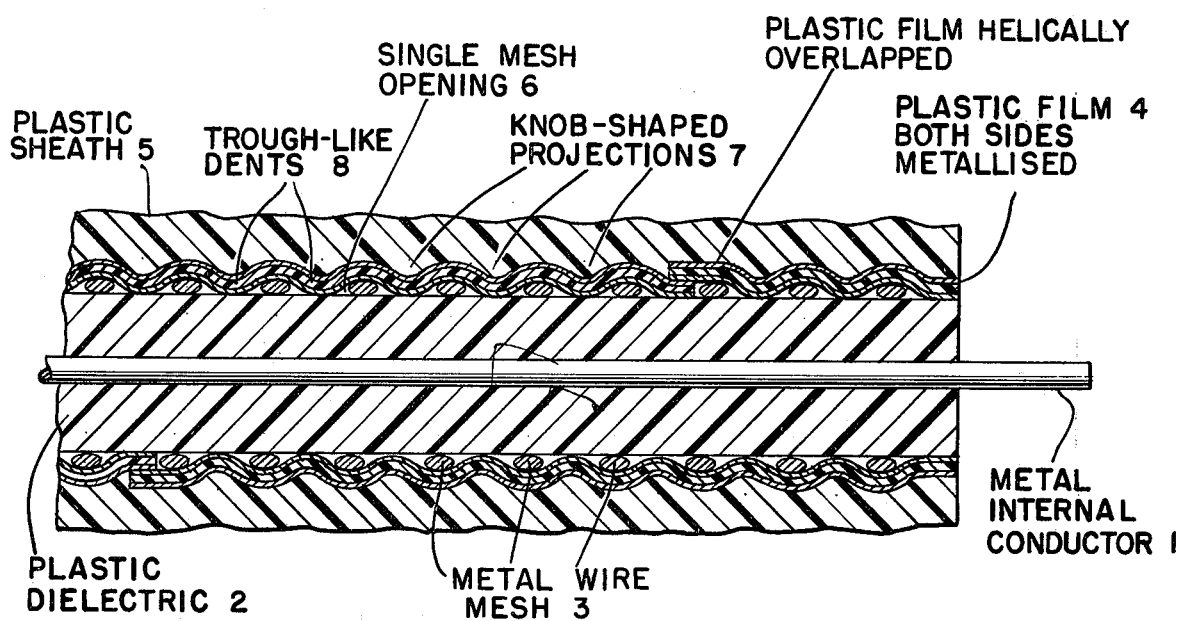

The invention is described in more detail hereinbelow on the basis of the drawing illustration one example of construction:

FIG. 1 is a fragmentary perspective view of a coaxial cable of the invention with the external plastic sheath and the metalized plastic film stripped back to reveal the method of construction; and FIG. 2 is an enlarged longitudinal cross-sectional view illustrating the structural details of the present coaxial cable.

The coaxial cable consists of an internal conductor 1 of copper, a full-dielectric 2 of polyethylene surrounding the internal conductor concentrically, a wire mesh 3 of copper wire surrounding the dielectric 2, a plastic foil 4 metallised on both sides, of polypropylene with an aluminium coating on both sides, laid helically around the wire mesh 3 and forming together with the wire mesh 3 the external conductor of the cable, its strip edges overlapping, and a plastic coating 5 of polyvinyl chloride surrounding the metallised plastic foil 4 as an external protective envelope.

Except for the additional metallised plastic foil 4 and an increased mesh width of the wire mesh 3, the construction of the coaxial cable shown in the drawing corresponds to the construction of the known coaxial cable provided with a wire mesh as external conductor described above.

As compared with a known coaxial cable of corresponding construction (i.e. identically constructed and dimensioned, but without the metallised plastic foil and with smaller mesh width of the wire mesh) the coaxial cable of the invention exhibits considerably better transmission qualities and in particular a substantially higher upper limit of the transmission range. This is essentially to be attributed to the screening effect of the plastic foil metallised on both sides which screens the internal space of the cable from about 200 MHz and above almost completely from the external space and thereby prevents the influence of external interference fields upon the cable or a so-called irradiation into the cable in practically completely and thereby keeps the noise level of the cable low, and secondly considerably reduces the outward radiation through the wire mesh which increases rapidly from about 200 to 300 MHz in the known cable.

In spite of these considerably better transmission qualities the flexibility of the cable shown in the drawing and thereby also its ease of installation around corners and edges are even better than the definitely already very good flexibility of the known cable. The improvement of flexibility is substantially to be attributed to the greater mesh width of the wire mesh 3 of the cable shown in the drawing as compared with the known cable. This greater mesh width is made possible by means of the screening of the cable achieved with the metallised plastic foil 4. With the known cable, a correspondingly great mesh width of the wire mesh would not be possible because, with an increase of the mesh width of the wire mesh the radiation losses also increase and thereby the upper limit of the transmission range would drop further. With the cable shown in the drawing the increased mesh width of the wire mesh 3 has, however, yet a further advantage. For, by means of it, as a result of the pressure onto the plastic coating 5 at the time of its application, the metallised plastic foil 4 is deformed into trough-shaped recesses or dents at the areas of the dielectric 2 not covered by the wire mesh 3, i.e. the gaps 6 or interstices between the wires of the wire mesh 3, and the inner wall of the plastic coating 5 has knob-shaped projections 7 extending into these trough-shaped recesses 8 in the plastic foil layer 4. There is produced thereby a kind of mechanical engagement between the plastic coating 5, the metallised plastic foil 4 and the wire mesh 3, and as a result a considerable increase in the mechanical stability of the cable and of the compactness of its parts 3, 4 and 5 surrounding the dielectric 2 is achieved, with the consequence also that the tear-producing elongation stress of the metallised plastic foil 4 on a pronounced bending of the cable reduces considerably. Tests have shown that the plastic foil 4, even on outstandingly pronounced bends of the cable, as would hardly occur in practice—presumably because of its compact embedding between the wire mesh 3 and the plastic coating 5—does not tear, nor do substantial reflections take place with such a pronounced bending of the cable.

In the following table an indication is given of the measurement values of the characteristic magnitudes such as wave resistance, frequency effect and structural return loss obtained on testing a sample of the coaxial cable shown in the drawing. The test sample had a nominal wave resistance of 75 ohm, an internal conductor diameter of 0.73 mm, an internal diameter of the external conductor of 4.6 mm, a cable diameter of 6.5 mm and a cable weight of 4.75 kg/100 m, and was provided with a dielectric of polyethylene and a wire mesh of 64 copper wires of 0.15 mm diameter, as well as a metallised plastic foil of 20μ thick polypropylene with on each side an aluminium coating of 10μ thickness, also a plastic coating of polyvinyl chloride.

| | |
|---|---|
| Test values of wave resistance: | 75 ohm ± 3 ohm |
| Test values of the structural return loss inside the transmission range | 35 dB |
| Frequency effect or damping on 100 m cable length | 50 MHz 6.5 dB ( 6.39 dB) |
| | 100 MHz 9.0 dB ( 8.09 dB) |
| | 200 MHz 13.0 dB (10.1 dB) |
| | 300 MHz 15.5 dB (11.4 dB) |
| | 600 MHz 22.0 dB (13.7 dB) |
| | 800 MHz 27.0 dB (14.7 dB) |

The bracketed damping values represent the damping which a fictitious ideal, i.e. a completely radiation and reflection free coaxial cable with identical inner diameter of the external conductor and identical diameter of the internal conductor to those of the test sample, a copper wire as internal conductor, a rectilinear thick-walled copper tube as external conductor and the same dielectric as with the test sample would exhibit. These bracketed damping values of this fictitious coaxial cable are caused in principle by the relatively high resistance of the internal conductor caused by the skin effect, or in analogous manner by the voltage division between this longitudinal resistance and the cross-resistance formed by the terminal resistance of the cable, and are therefore damping values that cannot be exceeded with the given arrangement or even under otherwise ideal conditions. It results from this test that the damping caused by reflections and radiation losses, on the test sample, e.g. at 800 MHz only 12.3 dB was therefore relatively small, and that thus the upper limit of the transmission range on the test sample was over 1 GHz. A greater improvement to almost 3 GHz can be achieved through using as a metallised plastic foil a foil strip with copper coatings on both sides and a thorough direct electrical connection between these coatings along the strip edges as well as a thin silver coating on the copper coatings, and thereby, as already described above, a closed enveloping of the internal space of the cable is achieved, which prevents any radiation.

I claim:

1. A high frequency coaxial cable for aerial and ultra-high-frequency lines, comprising a metal internal conductor, a plastic dielectric concentrically surrounding the internal conductor, an external conductor surrounding the dielectric and comprising a metal wire mesh and a plastic foil strip metallised on at least one side, and a plastic sheath enveloping the external conductor as an external protective cover, the wires of said wire mesh being arranged in netlike configuration to define an open wire mesh deposited on the dielectric and said plastic foil strip being applied on the wire mesh in helical edgewise overlapping windings with said metallised side facing the wire mesh and being pressed into each single mesh of the wire mesh in the form of a generally trough-like dent thereby short-circuiting each single mesh of the wire mesh.

2. A high frequency coaxial cable according to claim 1, wherein the internal wall of said plastic sheath is provided with generally knob-shaped projections fitting into said trough-like dents in said plastic foil strip.

3. A high frequency coaxial cable according to claim 1, wherein the metal wire mesh is formed of two groups, substantially equal in number, of uninsulated wires winding helically in opposite senses of rotation around the dielectric and in braided relation.

4. A high frequency coaxial cable according to claim 3, wherein the wires of said wire mesh are provided with a metal coating.

5. A high frequency coaxial cable according to claim 1, wherein the metal wire mesh is constructed of two equal groups of uninsulated wires, each group forming one of two superposed layers of wires, the wires of each group being evenly distributed around the periphery of the dielectric, the wires of the two groups running in opposite senses of rotation helically around the dielectric and being in electrical contact at their mutually facing points of intersection.

6. A high frequency coaxial cable according to claim 5, wherein the wires of said wire mesh are provided with a metal coating.

7. A high frequency coaxial cable according to claim 1, wherein the plastic foil strip is metallised on both sides.

8. A high frequency coaxial cable according to claim 7, wherein the metal coatings on both sides of the metallised foil strip are in electric contact with one another at the strip edges and/or at points distributed over their contiguous surfaces.

9. A high frequency coaxial cable according to claim 7, wherein the width of the overlapping area of the margins of the plastic foil strip is between 20% and 40% of the width of the plastic foil strip.

10. A high frequency coaxial cable according to claim 1, wherein the metal coating of the plastic foil strip is made of aluminum.

11. A high frequency coaxial cable according to claim 10, wherein the total thickness of metal coating on the plastic foil strip is at least $20\mu$.

12. A method of producing a high frequency coaxial cable for aerial and ultra-high-frequency lines comprising the steps of applying around a metal internal conductor a plastic dielectric concentrically surrounding the internal conductor, applying around said plastic dielectric an external conductor comprising a metal wire mesh and a plastic foil strip metallised on at least one side, said metal wire mesh being applied in form of an open wire mesh by arranging the wires thereof in netlike configuration and said plastic foil strip being applied on said mesh by winding the plastic foil strip with its metallised side facing the wire mesh in the form of helical edgewise overlapped windings on the wire mesh, and applying on said windings of the metallised plastic foil strip a plastic sheath as an external protective cover by extrusion under pressure of sufficient magnitude as to press the metallised plastic foil into each single mesh of the netlike wire mesh in the form of a generally trough-like dent and to fill these trough-like dents with material of the plastic sheath thereby providing the internal surface of the plastic sheath with generally knob-shaped projections fitting into said trough-like dents.

13. The method according to claim 12, wherein the plastic sheath is applied on said windings of the metallised plastic foil strip at a temperature in the range of 50° C. to 200° C. and at a pressure of more than 5 atmospheres, preferably 10 to 50 atmospheres.

* * * * *